US010917171B2

(12) United States Patent
Zhang et al.

(10) Patent No.: US 10,917,171 B2
(45) Date of Patent: Feb. 9, 2021

(54) FIBER NONLINEAR NOISE MONITORING METHOD AND APPARATUS AND OPTICAL RECEIVER

(71) Applicant: Fujitsu Limited, Kawasaki (JP)

(72) Inventors: Ke Zhang, Beijing (CN); Zhenning Tao, Beijing (CN); Yangyang Fan, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/577,680

(22) Filed: Sep. 20, 2019

(65) Prior Publication Data

US 2020/0106523 A1    Apr. 2, 2020

(30) Foreign Application Priority Data

Sep. 28, 2018    (CN) .......................... 2018 1 1142976

(51) Int. Cl.
*H04B 10/079*    (2013.01)
(52) U.S. Cl.
CPC ... *H04B 10/07953* (2013.01); *H04B 10/0799* (2013.01)
(58) Field of Classification Search
CPC ................ H04B 10/07953; H04B 10/0799
See application file for complete search history.

(56) References Cited

U.S. PATENT DOCUMENTS

| 9,166,682 B2 | 10/2015 | Renaudier et al. |
| 2012/0269507 A1 | 10/2012 | Renaudier et al. |

(Continued)

FOREIGN PATENT DOCUMENTS

| CN | 102088319 | 6/2011 |
| CN | 102656824 | 9/2012 |
| CN | 107566039 | 1/2018 |

OTHER PUBLICATIONS

Z. Y. Wang, A. Y. Yang and P. Guo et al., "OSNR and nonlinear noise power estimation for optical fiber communication systems using LSTM based deep learning technique". Optics Express. vol. 26, No. 16, 2018. (Year: 2018).*

(Continued)

*Primary Examiner* — Nathan M Cors
(74) *Attorney, Agent, or Firm* — Staas & Halsey LLP (57) ABSTRACT

A method and apparatus of fiber nonlinear noise monitoring and an optical receiver is provided. The method includes: acquiring a training set including at least two received signal samples obtained after a transmitting signal passes different simulation transmission scenarios, calculating amplitude noise feature values after a digital signal processing, calculating statistics values of fiber nonlinear noises, marking the amplitude noise feature values; taking the amplitude noise feature values as input of a noise monitoring model, taking marks to which the amplitude noise feature values correspond as target output, and training the noise monitoring model according to samples in the training set, so as to obtain a trained noise monitoring model, and inputting a plurality of amplitude noise feature values of received signals to be monitored into the trained noise monitoring model, so as to obtain statistics values of fiber nonlinear noises to which the received signals to be monitored correspond.

19 Claims, 4 Drawing Sheets

(56) References Cited

U.S. PATENT DOCUMENTS

| | | | | |
|---|---|---|---|---|
| 2016/0013863 | A1* | 1/2016 | Dou | H04J 14/06 |
| | | | | 398/32 |
| 2016/0269110 | A1* | 9/2016 | Dahan | H04B 10/0793 |
| 2017/0019172 | A1 | 1/2017 | Yang et al. | |
| 2018/0069626 | A1* | 3/2018 | Zhao | H04B 10/07953 |
| 2018/0269968 | A1* | 9/2018 | Zhuge | G06N 20/00 |

OTHER PUBLICATIONS

A. S. Kashi et al., "Fiber Nonlinear Noise-to-Signal Ratio Monitoring Using Artificial Neural Networks," 2017 European Conference on Optical Communication (ECOC), paper M2F2., Sep. 21, 2017. (Year: 2017).*

F. J. Vaquero Caballero et al.; "Machine Learning Based Linear and Nonlinear Noise Estimation," J. Opt. Commun. Netw., vol. 10, No. 10, available online Jun. 5, 2018 at https://ieeexplore.ieee.org/stamp/stamp.jsp?arnumber=8501526. (Year: 2018).*

A. S. Kashi et al., "Fiber Nonlinear Noise-to-Signal Ratio Monitoring Using Artificial Neural Networks," 2017 European Conference on Optical Communication (ECOC), paper M2F2., Sep. 21, 2017.

Dong Z, Lau A P T, Lu C. OSNR monitoring for QPSK and 16-QAM systems in presence of fiber nonlinearities for digital coherent receivers.[J]. Optics Express, 2012, 20(17):19520.

Wang W, Yang A, Guo P, et al. Joint OSNR and interchannel nonlinearity estimation method based on fractional Fourier transform[J]. Journal of Lightwave Technology, 2017, pp. (99):1-1.

Z. Y. Wang, A. Y. Yang and P. Guo et al., "OSNR and nonlinear noise power estimation for optical fiber communication systems using LSTM based deep learning technique". Optics Express. vol. 26, No. 16, 2018(21346).

\* cited by examiner

FIBER NONLINEAR NOISE MONITORING METHOD AND APPARATUS AND OPTICAL RECEIVER

CROSS-REFERENCE TO RELATED APPLICATIONS

This application is based on and claims priority from Chinese Application No. 201811142976.7, filed Sep. 28, 2018, in the State Intellectual Property Office of China, the disclosure of which is incorporated herein by reference.

TECHNICAL FIELD

This disclosure relates to the field of communication technologies, and in particular to a fiber nonlinear noise monitoring method and apparatus and an optical receiver.

BACKGROUND

In recent years, with the continuous and rapid growth of network services with high uncertainty of traffic and flow, there is an increasing demand for bandwidths and management of optical transmission networks, which greatly promotes the development of next-generation fiber-optic communication networks represented by intelligent optical network technologies.

An intelligent optical network is a flexible, dynamic and software-defined optical network, which requires that a physical layer network must be dynamically flexible, so as to cope with dynamic traffic demands, and this is realized by performing routing policy making and planning according to the quality information of transmitted signals. An optical performance monitoring technology is an important technology for monitoring and diagnosing transmission signal damages. A fiber nonlinear noise is one of the main factors affecting quality of transmitted signals, and it is of great significance to accurately and effectively monitor it. For example, when quality of a signal of a line is degraded, whether the quality degradation is resulted from a too large link fiber nonlinear noise may be excluded with assistance of an accurate fiber nonlinear noise monitoring technique, and in performing dynamic routing allocation, whether a fiber nonlinear noise of the routing line is within a designed allowance may be pre-judged by using the fiber nonlinear noise monitoring technique, or the like. In recent years, as great achievements have been made in machine learning with respect to such fields as image recognition, natural language processing, and data mining, researchers have begun to take the machine learning as means for studies and apply it to the field of optical communications.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

At present, means for monitoring a fiber nonlinear noise is carried out based mainly on a correlation function between symbols. For example, a sum of amplitude noise correlation functions between adjacent symbols and such link parameters as link total dispersion, and the number of channels, are taken as feature values and inputted into an artificial neural network to obtain a statistics value of the fiber nonlinear noise. As this method needs to rely on the link parameters, and the link parameters are difficult to be acquired by an optical receiver, implementation of the method is greatly limited. And as some useful information may be lost in the summation of the amplitude noise correlation functions, precision of a result of monitoring the fiber nonlinear noise is limited.

Embodiments of this disclosure provide a fiber nonlinear noise monitoring method and apparatus and an optical receiver, in which no link parameter is needed to be taken as an input feature, and implementation is simple. And furthermore, no summation of a plurality of amplitude noise feature values is performed, which may improve precision of a result of monitoring a fiber nonlinear noise.

According to an aspect of the embodiments of this disclosure, there is provided an apparatus for fiber nonlinear noise monitoring including a memory and a processor coupled to the memory. The processor is configured to: acquire a training set comprising at least two received signal samples obtained after a transmitting signal passes different simulation transmission scenarios, calculate a plurality of amplitude noise feature values of the at least two received signal samples after performed digital signal processing is performed, calculate statistics values of fiber nonlinear noises to which the at least two received signal samples correspond, mark the plurality of amplitude noise feature values of the at least two received signal samples according to the statistics values of the fiber nonlinear noises.

The processor is configured to take the plurality of amplitude noise feature values of the at least two received signal samples as input of a noise monitoring model, take marks to which the plurality of amplitude noise feature values correspond as target output of the noise monitoring model, and train the noise monitoring model by using a predetermined algorithm according to samples in the training set, so as to obtain a trained noise monitoring model; and input a plurality of amplitude noise feature values of received signals to be monitored into the trained noise monitoring model, so as to obtain statistics values of fiber nonlinear noises to which the received signals to be monitored correspond.

According to an aspect of the embodiments of this disclosure, there is provided a method of fiber nonlinear noise monitoring. The method includes: acquiring a training set including at least two received signal samples obtained after a transmitting signal passes different simulation transmission scenarios; calculating a plurality of amplitude noise feature values of the received signal samples after a digital signal processing is performed; calculating statistics values of fiber nonlinear noises to which the at least two received signal samples correspond. The method includes marking the plurality of amplitude noise feature values of the at least two received signal samples are marked according to the statistics values of the fiber nonlinear noises; taking the plurality of amplitude noise feature values of the received signal samples as input of a noise monitoring model, marks to which the plurality of amplitude noise feature values correspond are taken as target output of the noise monitoring model, where the noise monitoring model is trained by using a predetermined algorithm according to samples in the training set, so as to obtain a trained noise monitoring model; and a plurality of amplitude noise feature values of received signals to be monitored are inputted into the trained noise monitoring model, so as to obtain statistics values of fiber nonlinear noises to which the received signals to be monitored correspond.

According to an aspect of the embodiments of this disclosure, there is provided an optical receiver, including the apparatus described in the first aspect.

According to an aspect of the embodiments of this disclosure, there is provided an optical communication system, including the optical receiver described in the third aspect.

An advantage of the embodiments of this disclosure exists in that by taking received signals pre-obtained at different simulation scenarios as samples and taking a plurality of amplitude noise feature values extracted from the received signal samples as input features of a noise monitoring model, the noise monitoring model is trained by using a machine learning method, and fiber nonlinear noises are monitored by using the model. Hence, no link parameter is needed to be taken as an input feature, and implementation is simple. And furthermore, no summation of amplitude noise feature values is performed, which may improve precision of a result of monitoring fiber nonlinear noises.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "include/comprise" when used in this specification is taken to specify the presence of stated features, integers, steps, operations or components but does not preclude the presence or addition of one or more other features, integers, steps, operations, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION OF THE DISCLOSURE

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Various embodiments of this disclosure shall be described below with reference to the accompanying drawings. These embodiments are illustrative only, and are not intended to limit this disclosure.

Embodiment 1

Figure 1:
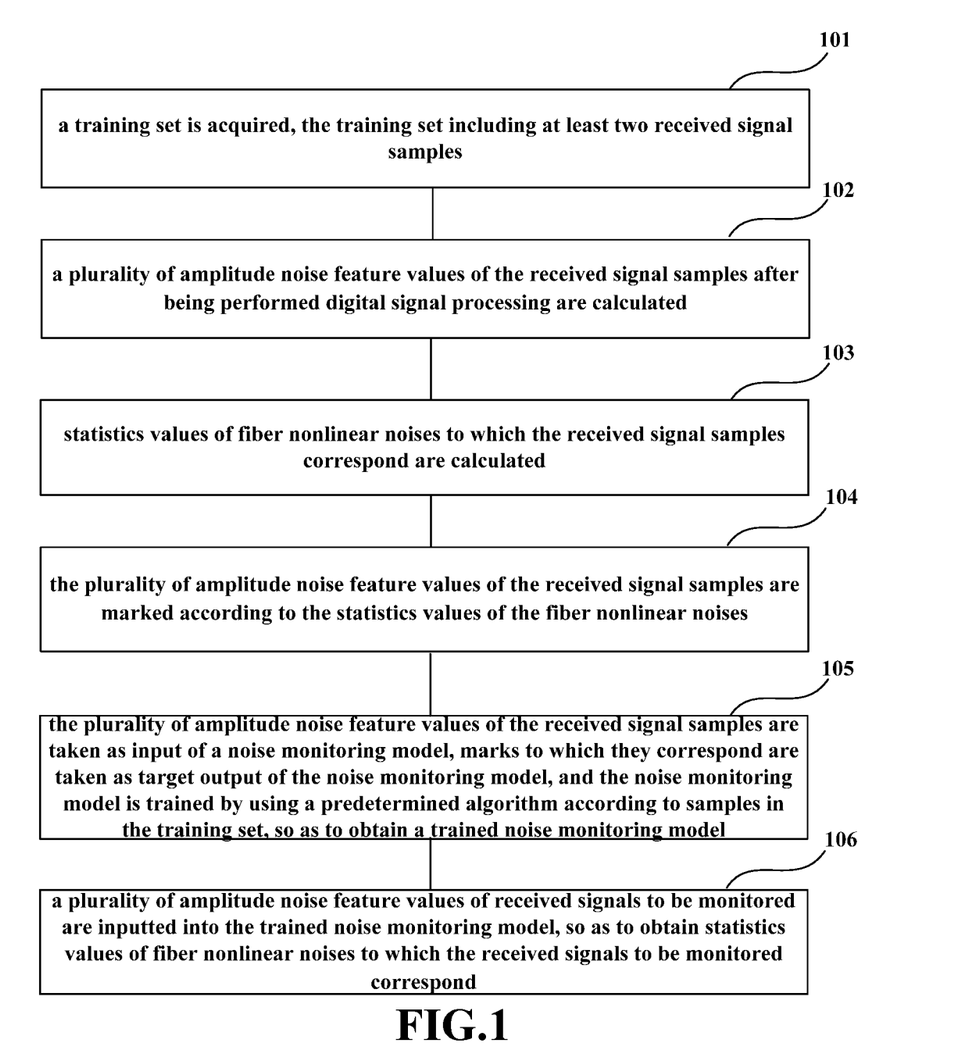
FIG. 1 is a flowchart of the fiber nonlinear noise monitoring method according to an embodiment of this disclosure.

This embodiment provides a fiber nonlinear noise monitoring method. FIG. 1 is a flowchart of the method. As shown in FIG. 1, the method includes:

operation 101: a training set is acquired, the training set including at least two received signal samples; wherein different received signal samples are obtained after a transmitting signal passes different simulation transmission scenarios;

operation 102: a plurality of amplitude noise feature values of the received signal samples after being performed digital signal processing are calculated;

operation 103: statistics values of fiber nonlinear noises to which the received signal samples correspond are calculated;

operation 104: the plurality of amplitude noise feature values of the received signal samples are marked according to the statistics values of the fiber nonlinear noises;

operation 105: the plurality of amplitude noise feature values of the received signal samples are taken as input of a noise monitoring model, marks to which they correspond are taken as target output of the noise monitoring model, and the noise monitoring model is trained by using a predetermined algorithm according to samples in the training set, so as to obtain a trained noise monitoring model; and operation 106: a plurality of amplitude noise feature values of received signals to be monitored are inputted into the trained noise monitoring model, so as to obtain statistics values of fiber nonlinear noises to which the received signals to be monitored correspond.

In this embodiment, received signals corresponding to different transmission scenarios may be pre-collected in a simulation environment and taken as samples in the training set in operation 101. The simulation transmission scenario parameters include: the number of channels, transmission power, a transmission distance, a fiber type, a fiber span combination, a modulation format and a baud rate of a channel signal, whether a link contains a reconfigurable optical add-drop multiplexer (ROADM), and a link dispersion compensation proportion, and the like.

In this embodiment, reference may be made to the related art for a configuration manner of the above parameters. For example, the fiber span combination may be configured to be equidistant or not equidistant, or a combination of being equidistant and being not equidistant, the fiber type may be configured to be of one fiber type or a combination of a plurality of fiber types, and may include an ordinary single mode fiber (SMF), and non-zero dispersion shifted fiber (NZDSF), etc., and the modulation format of the channel signal may be configured as quadrature amplitude modulation (QAM) or phase shift keying (PSK), etc., including that an ROADM scenario may be configured to be a change of a signal payload or a modulation format or a baud rate of a neighboring channel to be monitored, etc., the number of channels, the incident power, the transmission distance, the link dispersion compensation proportion, and the baud rate of the channel signal being able to be configured as particular values, and the modulation format and baud rate of the channel signal being also able to be configured to be that a signal of a neighboring channel and a signal of a central channel have identical or different modulation formats, or the like.

In this embodiment, the above transmission scenario may be simulated by software; for example, a coherent fiber transmission system may be constructed by using existing VPI simulation software, and at least two different transmission scenarios may be configured for the coherent fiber transmission system; wherein the different simulation transmission scenarios denote that types of the above parameters included therein are completely different, or partially different, and/or values configured for all parameters or part of parameters are different. For example, in a case where values of other system parameter configurations are identical, parameter configurations of the link dispersion compensation ratio are different; for example, one simulation transmission is a link that is not dispersion compensated (equivalent to that a link dispersion compensation ratio is zero), and the other is a link that is dispersion compensated (equivalent to that a link dispersion compensation ratio is a non-zero value). The above two simulation transmission scenarios denote different simulation transmission scenarios; or, for example, one of the two simulation transmission scenarios contains an ROADM scenario, and the other does not contain an ROADM scenario, and the two simulation transmission scenarios denote different simulation transmission scenarios; or, for example, in a case where values of other system parameter configurations are identical, the number of channels, incident power and a transmission distance configured for two two simulation transmission scenarios are different; the number of channels of one of the simulation transmission scenarios is X1, with a combination of equidistant fiber spans, and a transmission distance of S1; and the number of channels of the other one of the simulation transmission scenarios is X2, with a combination of unequidistant fiber spans, and a transmission distance of S1; the fiber span combination configurations are equidistant and unequal, respectively. P1 and P2 are different, and even if transmission distances of the two simulation transmission scenarios are identical, the two simulation transmission scenarios belong to different simulation transmission scenarios. Examples of different simulation transmission scenarios are not limited to the above implementations, which shall not be enumerated herein any further.

In this embodiment, a received signal obtained in each simulation transmission scenario constitute one received signal sample, and different received signal samples may be obtained for different simulation transmission scenarios, and all the received signal samples constitute the training set in operation 101.

In this embodiment, after operation 101, the method may further include (not shown): performing digital signal processing on the received signal samples, so that more accurate feature values are extracted in operation 102. The digital signal processing may include at least one of Gram-Schmidt orthogonalization processing (GSOP), normalized resampling, dispersion compensation, constant modulus algorithm adaptive equalization and polarization demultiplexing, frequency offset compensation, and carrier phase recovery, and reference may be made to the related art for a process of the digital signal processing, which shall not be described herein any further.

In this embodiment, the received signal obtained after the transmitting signal passes through the simulation transmission scenario is subjected to a transceiver noise and a fiber nonlinear noise, and alternatively, increase of interference of amplifier spontaneous emission (ASE) noises may be simulated, or interference of amplifier spontaneous emission (ASE) noises may not be increased. Distortion of the signal resulted from these noises is very similar, and components of the fiber nonlinear noise may not be extracted simply by calculating an error vector amplitude or in a manner of spectral analysis. As an ASE noise and a transceiver noise are white noises, which are not correlated with respect to different symbols in a time sequence, and fiber nonlinear noises are correlated between a number of neighboring symbols, the correlations are taken as features in operations 102-106 in this embodiment, the fiber nonlinear noises obtained through calculation in the simulation transmission scenarios are taken as marks to mark different features, and the features and corresponding marks are used to train the noise monitoring model. The model may establish a correspondence between the features and the marks, the feature being taken as input of the model, and the mark being taken as output of the model. That is, a mark of the feature may be obtained according to the model and the inputted feature, then and the fiber nonlinear noise statistic value corresponding to the feature may be obtained.

In this embodiment, in calculating the feature values of the samples in operation 102, in order to make the feature values closer to feature values of actually tested received signals, ASE noises may be added during the simulation, so that the received signal samples are subjected to interference of the transceiver noises, the fiber nonlinear noises and the ASE noises; however, this embodiment is not limited thereto, and the ASE noises may not be added, and the received signal samples are only subjected to interference of the transceiver noises and the fiber nonlinear noises. In this embodiment, in calculating the statistics values in operation 103, the received signal samples not subjected to interference of the ASE noises may used for the calculation. Hence, accurate statistics values of the fiber nonlinear noises may be obtained.

In this embodiment, operations 102 and 103 may be performed sequentially; however, an order of execution is not limited in this embodiment, and they may also be performed simultaneously.

In this embodiment, as the fiber nonlinear noises are correlated between a number of neighboring symbols, a plurality of (L) amplitude noise feature values are taken as the feature values for monitoring the fiber nonlinear noises, and the amplitude noise feature values include amplitude noise covariance, the number L of pieces of the amplitude noise covariance being determined according to an inter-symbol amplitude autocorrelation length resulted from the fiber nonlinear noises, for example, a predetermined number L of pieces of autocorrelation may be selected as needed.

Figure 2:
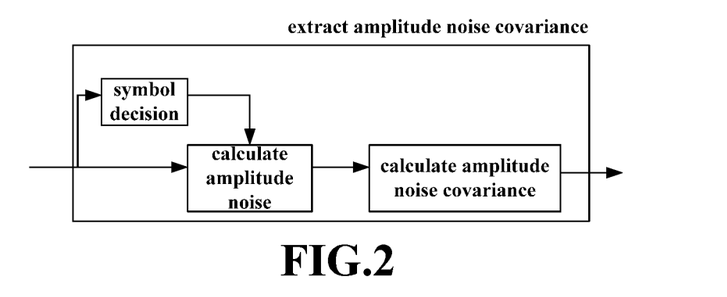
FIG. 2 is a schematic diagram of calculating an amplitude noise feature value according to an embodiment of this disclosure.

In one implementation of operation 102, the amplitude noise covariance may be calculated according to the received signal samples. FIG. 2 is a schematic diagram of a method for calculating the amplitude noise covariance. As shown in FIG. 2, the amplitude noises may be calculated first by using formula 1) below, and then the amplitude noise covariance may be calculated by using formula 2) below.

$$\Delta A_{x/y}(k) = |r_{x/y}(k)| - |\hat{s}_{x/y}(k)| \qquad \text{formula 1);}$$

where, x and y respectively denote the x polarization state and the y polarization state, k denotes a time sequence number, $r_{x/y}(k)$ denotes a k-th symbol obtained after digital signal processing (carrier phase recovery) is performed on the received signal samples, and $\hat{s}_{x/y}(k)$ denotes the k-th symbol after being decided.

$$ANC_{ij}(m) = \text{cov}[\Delta A_{ij}(k), \Delta A_{ij}(k+m)] \text{ for } i,j \in \{x,y\} \qquad \text{formula 2);}$$

where, m denotes the number of symbols spaced apart by the amplitude noise covariance, a maximum value of m being determined as demanded, for example, m being an integer between [1, L], L being greater than 1, for example, L being 6; however, this embodiment is not limited thereto. When i≠j, $ANC_{ij}(m)$ denotes amplitude noise covariance of a single polarization state; and when $ANC_{ij}(m)$ denotes amplitude noise covariance between two polarization states, $ANC_{ij}(1)$, $ANC_{ij}(2)$, ..., $ANC_{ij}(M)$ (i=j) and $ANC_{ij}(0)$, $ANC_{ij}(1)$, $ANC_{ij}(2)$, ..., $ANC_{ij}(M)$ (i≠j) being taken as the plurality of amplitude noise feature values calculated in operation 102.

Figure 3:
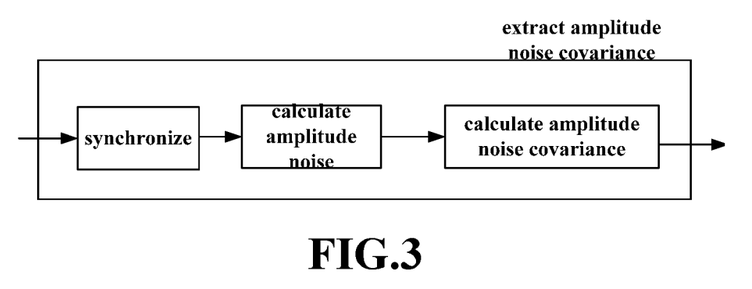
FIG. 3 is a schematic diagram of calculating an amplitude noise feature value according to an embodiment of this disclosure.

In another implementation of operation 102, the amplitude noise covariance may be calculated according to the received signal samples and the transmitting signal. FIG. 3 is a schematic diagram of a method for calculating the amplitude noise covariance. As shown in FIG. 3, a periodic training sequence may be inserted into a frame structure of the transmitting signal, the received signals are synchronized according to the periodicity, amplitude noises are calculated according to the periodic training sequence and the received signals, and the amplitude noise covariance is calculated according to the amplitude noises. The periodic training sequence may be constant amplitude zero autocorrelation (CAZAC) sequence having a constant modulus characteristic or an M-PSK pilot sequence or an M-QAM signal having known codewords, the amplitude noises may be calculated first by using formula 3) below, and then the amplitude noise covariance may be calculated by using formula 2) below.

$$\Delta A_{x/y}(k) = |r_{x/y}(k)| - |s_{x/y}(k)| \qquad \text{formula 3);}$$

where, $r_{x/y}(k)$ denotes the k-th symbol obtained after digital signal processing (carrier phase recovery) is performed on the received signal samples, and $|s_{x/y}(k)|$ denotes a modulo value of the k-th symbol of the training sequence.

In this embodiment, the amplitude noise covariance may be expressed by a logarithmic value and/or a linear value, that is, the amplitude noise covariance $ANC_{ij}(m)$ obtained through calculation by using formula 2) may be directly taken as the input of the noise monitoring model, or a logarithm of the amplitude noise covariance $ANC_{ij}(m)$ obtained through calculation by using formula 2) may be calculated, and the logarithmic value log $ANC_{ij}(m)$ may be taken as the input of the noise monitoring model. The logarithmic processing facilitates fitting of input and output data, and may speed up the training process.

In this embodiment, how to calculate the amplitude noise covariance may be determined according to modulation modes of the signals. For example, for an M-PSK signal, all transmitting signals have identical modulo values, and need not to be synchronized, that is, the amplitude noise covariance may be directly calculated without needing to insert a training sequence; and for an M-QAM signal, the scheme in the above FIG. 3 may be adopted, and the amplitude noise covariance is calculated by using formulae 3) and 2) after performing synchronization.

How to calculate the amplitude noise covariance is illustrated above. However, a calculation method is not limited thereto, all methods for calculating the amplitude noise covariance may be applicable to this embodiment, and this embodiment is not limited thereto.

In this embodiment, $ANC_{ij}(1)$, $ANC_{ij}(2)$, ..., $ANC_{ij}(M)$ are taken as the plurality of amplitude noise feature values calculated in operation 102, or log $ANC_{ij}(1)$, log $ANC_{ij}(2)$, ..., log $ANC_{ij}(M)$ may taken as the plurality of amplitude noise feature values calculated in operation 102, that is, they are taken as the input of the noise monitoring model, without needing to sum up the plurality of amplitude noise feature values and take the sum as the input of the noise monitoring model. Hence, some useful information will not be lost, taking the plurality of amplitude noise feature values as the input of the noise monitoring model may fully use all valid information, thus precision of monitoring the noises may be improved. And furthermore, as only the plurality of amplitude noise feature values are taken as the input of the noise monitoring model without needing to take other link parameters (such as the number of channels, or total dispersion of a link) as the input of the noise monitoring model, the method is simple in implementation.

In this embodiment, the statistics values of fiber nonlinear noises to which the received signal samples correspond may measure a magnitude of interference of the fiber nonlinear noises to the signals, and the statistics values are also the objects to be monitored in this application. For example, the statistics values may include normalized fiber nonlinear noise power, and a fiber nonlinear noise to signal ratio or a fiber nonlinear signal to noise ratio.

In this embodiment, in operation 103, the fiber nonlinear noises may be calculated first, and then the statistics values may be obtained. For example, first variance of an error between the received signal samples and a complex signal of a corresponding transmitting signal and second variance of an error between a received signal and a complex signal of a corresponding transmitting signal in a back-to-back scenario may be calculated, and the statistics values of the fiber nonlinear noises may be calculated according to a difference between the first variance and the second variance. Formula 4) below may be referred to for particulars:

$$N=[\text{Var}(r1-s)|\text{Without ASE}-\text{Var}(r2-s)|B2B]) \text{ formula 4);}$$

where, the complex signal r1 denotes received signal samples after digital signal processing, which are not subjected to the interference of the ASE noises (if received signal samples subjected to the interference of the ASE noises are used in extracting the feature values, the received signal samples need to be re-obtained by removing the ASE noises in operation 103, and if received signal samples not subjected to the interference of the ASE noises are used in extracting the feature values, identical received signal samples may be used as r1 in operation 103), the complex signal r2 denotes received signal samples after digital signal processing in an optical back-to-back scenario, the complex signal s denotes a transmitting signal corresponding to r1 or r2, Var(r−s)|Without ASE denotes variance (the first variance) of an error between the received signal samples and the transmitting signal under a condition of no ASE noise, and Var(r−s)|B2B denotes variance (the second variance) of an error between the received signal and the transmitting signal in a back-to-back scenario. Reference may be made to the related art for a calculation method of the first variance and the second variance, which shall not be described herein any further.

In this embodiment, N may be normalized to obtain the statistics values, and a ratio of N to $E\langle|r1|^2\rangle$, i.e. a fiber nonlinear noise to signal ratio, may be taken as the statistics values; or a ratio of $E\langle|r1|^2\rangle$ to N, i.e. a fiber nonlinear signal to noise ratio, may be taken as the statistics values; however, this embodiment is not limited thereto; where, $E\langle|r1|^2\rangle$ denotes average power of the received signal sample r1.

In this embodiment, a plurality of amplitude noise feature values I of each received signal sample in the training set and the corresponding statistics values O of the fiber nonlinear noises are obtained through calculation in operations 102 and 103, and the plurality of amplitude noise feature values I of the received signal sample are marked according to the statistics values O of the fiber nonlinear noises in operation 104. In other words, the statistics values O of the fiber nonlinear noises are taken as labels, and objects that are marked are the plurality of amplitude noise feature values I. For at least two (W) received signal samples in the training set, W statistics values, $O_1, O_2, O_w, \ldots$, of the fiber nonlinear noises, and W groups of amplitude noise feature values, $I_1, I_2, I_w, \ldots$, may be obtained. $I_1, I_2, I_w$ are respectively marked by taking $O_1, O_2, O_w$ as labels, that is, a label of the feature value $I_1$ is $O_1$, a label of the feature value $I_2$ is $O_2, \ldots$, and a label of the feature value $I_w$ is $O_w$.

In this embodiment, I and O of each received signal sample are taken as a training data pair, thereby obtaining at least two (W) training data pairs. Using the W training data pairs, the noise monitoring model is trained according to a predetermined algorithm; wherein I is taken as the input of the noise monitoring model and O is taken as the output of the noise monitoring model to obtain a trained noise monitoring model. The noise monitoring model is a model reflecting a correspondence between sample features (a plurality of amplitude noise feature values) and sample tags (statistics values of fiber nonlinear noises), and the predetermined algorithm is a machine learning algorithm, such as existing support vector machine regression method, artificial neural network method. The related art may be referred to for a particular training process, which shall not be described herein any further.

In this embodiment, in operation 106, the received signals to be monitored may be obtained from an actual optical receiver. After the digital signal processing is performed on the received signals to be monitored, and the plurality of amplitude noise feature values of the processed received signals to be monitored are calculated by using the method in operation 102. Or the processed digital signals to be monitored may directly be obtained from the actual optical receiver, and the plurality of amplitude noise feature values of the processed received signals to be monitored are calculated by using the method in operation 102; however, this embodiment is not limited thereto. And as the received signals to be monitored are signals received by the actual optical receiver, they are subjected to interference of the transceiver noises, the ASE noises and the fiber nonlinear noises.

In this embodiment, the plurality of amplitude noise feature values of the received signals to be monitored are calculated by using the method in operation 102, and the output of the noise monitoring model is obtained by taking the plurality of amplitude noise feature values of the received signals to be monitored as the input of the trained noise monitoring model obtained in operation 105, i.e., the statistics values of the fiber nonlinear noises to which the received signals to be monitored correspond.

With the embodiment described above, by taking the received signals pre-obtained at different simulation scenarios as samples and taking a plurality of amplitude noise feature values extracted from the received signal samples as input features of the noise monitoring model, the noise monitoring model is trained by using a machine learning method, and the fiber nonlinear noises are monitored by using the model. Hence, no link parameter is needed to be taken as an input feature, and implementation is simple. And furthermore, no summation of a plurality of amplitude noise feature values is performed, which may improve precision of a result of monitoring fiber nonlinear noises.

Embodiment 2

Figure 4:
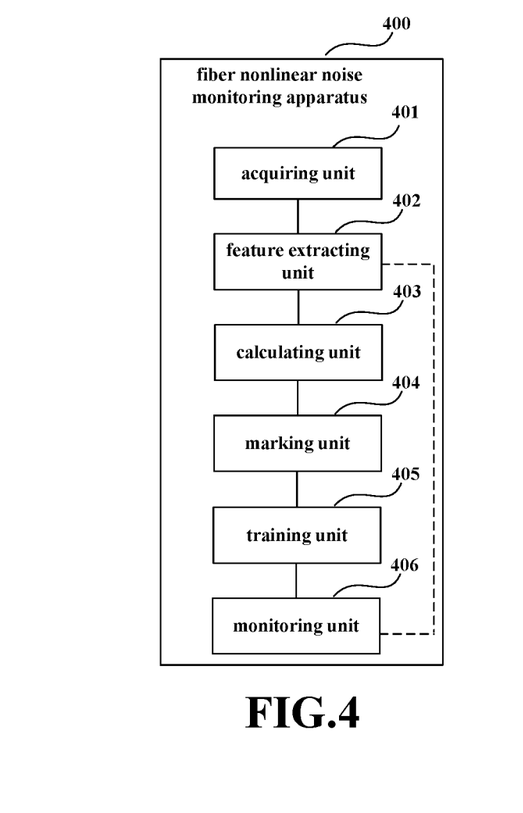
FIG. 4 is a schematic diagram of the fiber nonlinear noise monitoring apparatus according to an embodiment of this disclosure.

Embodiment 2 provides a fiber nonlinear noise monitoring apparatus, corresponding to the fiber nonlinear noise monitoring method of Embodiment 1. FIG. 4 is a schematic diagram of a structure of the fiber nonlinear noise monitoring apparatus of the embodiment of this disclosure. As shown in FIG. 4, a fiber nonlinear noise monitoring apparatus 400 includes:

an acquiring unit 401 configured to acquire a training set, the training set including at least two received signal samples; wherein different received signal samples are obtained after a transmitting signal passes different simulation transmission scenarios;

a feature extracting unit 402 configured to calculate a plurality of amplitude noise feature values of the received signal samples after being performed digital signal processing;

a calculating unit 403 configured to calculate statistics values of fiber nonlinear noises to which the received signal samples correspond;

a marking unit 404 configured to mark the plurality of amplitude noise feature values of the received signal samples according to the statistics values of the fiber nonlinear noises;

a training unit 405 configured to take the plurality of amplitude noise feature values of the received signal samples as input of a noise monitoring model, take marks to which they correspond as target output of the noise monitoring model, and train the noise monitoring model by using a predetermined algorithm according to samples in the training set, so as to obtain a trained noise monitoring model; and a monitoring unit 406 configured to input a plurality of amplitude noise feature values of received signals to be monitored into the trained noise monitoring model, so as to obtain statistics values of fiber nonlinear noises to which the received signals to be monitored correspond.

In this embodiment, reference may be made to operations 101-106 in Embodiment 1 for implementations of the acquiring unit 401, the feature extracting unit 402, the calculating unit 403, the marking unit 404, the training unit 405 and the monitoring unit 406, which shall not be described herein any further.

In this embodiment, reference may be made to Embodiment 1 for implementation of the transmission scenario, which shall not be described herein any further.

In this embodiment, alternatively, the apparatus may further include (not shown): a processing unit configured to perform digital signal processing on the received signal samples. Reference may be made to Embodiment 1 for implementation of the processing unit, which shall not be described herein any further.

In this embodiment, the apparatus may be provided in an optical receiver, or may be provided independent of an optical receiver. The received signals to be monitored may be received signals of the optical receiver, and the apparatus 400 may acquire the received signals from the optical receiver and take them as the received signals to be monitored; the processing unit of the apparatus 400 processes the received signals to be monitored, the feature extracting unit 402 calculates the plurality of amplitude noise feature values of the processed received signals to be monitored, and the monitoring unit 406 obtains the statistics values of the fiber nonlinear noises to which the received signals to be monitored correspond according to the result of calculation. Or, the received signals to be monitored may be signals obtained after being performed digital signal processing by the optical receiver on the received signals of the optical receiver, and the apparatus 400 may acquire the received signals from the optical receiver after being performed digital signal processing by the optical receiver and take them as the received signals to be monitored; with no need of the processing unit of the apparatus 400, the feature extracting unit 402 directly calculates the plurality of amplitude noise feature values of the processed received signals to be monitored, and the monitoring unit 406 obtains the statistics values of the fiber nonlinear noises to which the received signals to be monitored correspond according to the result of calculation. And the received signals to be monitored may also be acquired by the feature extracting unit 402 in the apparatus 400 from the optical receiver. Calculating the plurality of amplitude noise feature values of the received signals to be monitored by the feature extracting unit 402 in the apparatus 400 is illustrated above. However, this embodiment is not limited thereto, and the plurality of amplitude noise feature values of the received signals to be monitored may also be calculated by a calculating module provided in the optical receiver or another device, a result of calculation is directly inputted into the monitoring unit 406 of the apparatus 400, and the statistics values of the fiber nonlinear noises to which the received signals to be monitored correspond are obtained.

In this embodiment, the transmitting signal is subjected to interference of transceiver noises and fiber nonlinear noises after passing the simulation transmission scenario, and is not subjected to interference of ASE noises, or is subjected to interference of amplifier spontaneous emission (ASE) noises, after passing the simulation transmission scenario.

In this embodiment, the amplitude noise feature values include amplitude noise covariance, the number of pieces of the amplitude noise covariance being determined according to an intra-symbol amplitude autocorrelation length resulted from the fiber nonlinear noises, and the amplitude noise covariance being denoted by using a logarithmic value and/or by using a linear value.

In this embodiment, the feature extracting unit 102 calculates the amplitude noise covariance according to the received signal samples or according to the received signal samples and the transmitting signal. Reference may be made to formulae 1)-3) in the embodiment, which shall not be described herein any further.

For example, the feature extracting unit 102 may insert a periodic training sequence into a frame structure of the transmitting signal, synchronize the received signals according to the periodicity, calculate amplitude noises according to the periodic training sequence and the received signals, and calculate the amplitude noise covariance according to the amplitude noises.

In this embodiment, the statistics values of fiber nonlinear noises include: normalized fiber nonlinear noise power, and a fiber nonlinear noise to signal ratio or a fiber nonlinear signal to noise ratio.

In this embodiment, the calculating unit 403 calculates first variance of an error between the received signal samples and a complex signal of a corresponding transmitting signal and second variance of an error between a received signal and a complex signal of a corresponding transmitting signal in a back-to-back scenario, and calculates the statistics values of the fiber nonlinear noises according to a difference between the first variance and the second variance. Reference may be made to Embodiment 1, which shall not be described herein any further.

Figure 5:
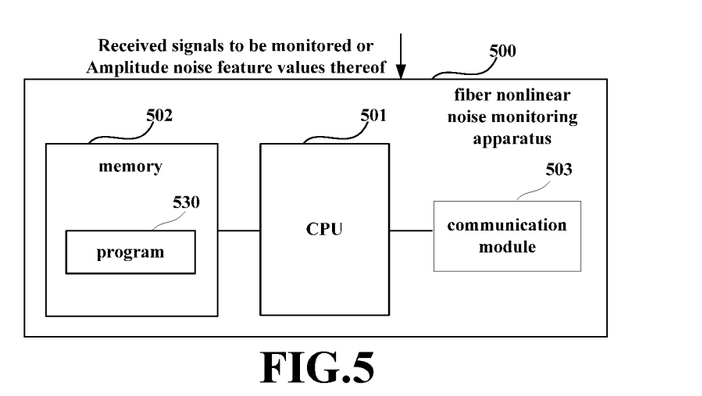
FIG. 5 is a schematic diagram of hardware of the fiber nonlinear noise monitoring apparatus according to an embodiment of this disclosure.

FIG. 5 is a block diagram of the fiber nonlinear noise monitoring apparatus of this embodiment. As shown in FIG. 5, a fiber nonlinear noise monitoring apparatus 500 may include a central processing unit 501 and a memory 502, the memory 502 being coupled to the central processing unit 501. It should be noted that this figure is illustrative only, and other types of structures may also be used, so as to supplement or replace this structure and achieve a telecommunications function or other functions.

In one implementation, the functions of the apparatus 400 described in Embodiment 2 may be integrated into the central processing unit 501, so as to carry out the method described in Embodiment 1.

For example, the central processing unit 501 may be configured to: acquire a training set, the training set comprising at least two received signal samples; wherein different received signal samples are obtained after a transmitting signal passes different simulation transmission scenarios; calculate a plurality of amplitude noise feature values of the received signal samples after being performed digital signal processing; calculate statistics values of fiber nonlinear noises to which the received signal samples correspond; mark the plurality of amplitude noise feature values of the received signal samples according to the statistics values of the fiber nonlinear noises; take the plurality of amplitude noise feature values of the received signal samples as input of a noise monitoring model, take marks to which they correspond as target output of the noise monitoring model, and train the noise monitoring model by using a predetermined algorithm according to samples in the training set, so as to obtain a trained noise monitoring model; and input a plurality of amplitude noise feature values of received signals to be monitored into the trained noise monitoring model, so as to obtain statistics values of fiber nonlinear noises to which the received signals to be monitored correspond.

In another implementation, the apparatus 400 described in Embodiment 2 and the central processing unit 501 may be configured separately. For example, the apparatus may be configured as a chip connected to the central processing unit 501, with its functions being realized under control of the central processing unit 501.

As shown in FIG. 5, the apparatus 500 may further include a communication module 503, etc., configured to acquire received signals to be monitored from an optical receiver. It should be noted that the apparatus 500 does not necessarily include all the parts shown in FIG. 5, and furthermore, the apparatus 500 may include parts not shown in FIG. 5, and the related art may be referred to.

As shown in FIG. 5, the central processing unit 501 is sometimes referred to as a controller or control, which may include a microprocessor or other processor devices and/or logic devices, and the central processing unit 501 receives input and controls operations of every component of the apparatus 500.

In one embodiment, the memory 502 may be, for example, one or more of a buffer memory, a flash memory, a hard drive, a mobile medium, a volatile memory, a nonvolatile memory, or other suitable devices, which may store the information on configuration, and furthermore, store programs executing related information. And the central processing unit 501 may execute programs stored in the memory 502, so as to realize information storage or processing, etc. Functions of other parts are similar to those of the related art, which shall not be described herein any further. The parts of the apparatus 500 may be realized by specific hardware, firmware, software, or any combination thereof, without departing from the scope of this disclosure.

With the embodiment described above, by taking the received signals pre-obtained at different simulation scenarios as samples and taking a plurality of amplitude noise feature values extracted from the received signal samples as input features of the noise monitoring model, the noise monitoring model is trained by using a machine learning method, and the fiber nonlinear noises are monitored by using the model. Hence, no link parameter is needed to be taken as an input feature, and implementation is simple. And furthermore, no summation of a plurality of amplitude noise feature values is performed, which may improve precision of a result of monitoring fiber nonlinear noises.

Embodiment 3

Figure 6:
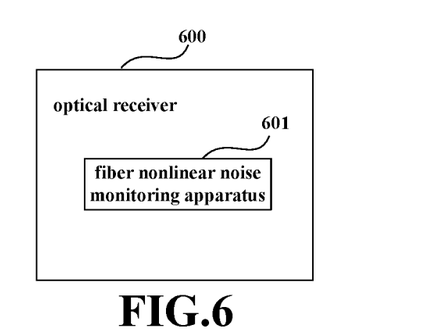
FIG. 6 is a schematic diagram of the optical receiver according to an embodiment of this disclosure.

Embodiment 3 provides an optical receiver. FIG. 6 is a schematic diagram of the optical receiver of Embodiment 3 of this disclosure. As shown in FIG. 6, an optical receiver 600 includes a fiber nonlinear noise monitoring apparatus 601, a structure and functions of the fiber nonlinear noise monitoring apparatus 600 being identical to those of the apparatus 400 described in Embodiment 2, which shall not be described herein any further.

Figure 7:
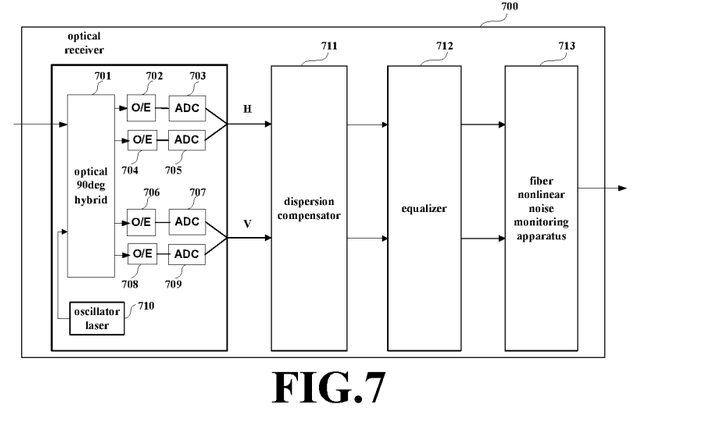
FIG. 7 is a schematic diagram of the optical receiver according to an embodiment of this disclosure.

FIG. 7 is a schematic diagram of a systematic structure of the optical receiver of Embodiment 3 of this disclosure. As shown in FIG. 7, an optical receiver 700 includes:

a front end configured to convert an input optical signal into baseband signals in two polarization states.

As shown in FIG. 7, the front end includes: an oscillator laser 710, an optical 90 deg hybrid 701, opto-electronic (O/E) detectors 702, 704, 706 and 708, analog-to-digital converters (ADCs) 703, 705, 707 and 709, a dispersion compensator 711, an equalizer 712 and a fiber nonlinear noise monitoring apparatus 713; wherein, a structure and functions of the fiber nonlinear noise monitoring apparatus 713 is identical to those of the apparatus 400 described in Embodiment 2, and the apparatus 713 acquires received signals to be monitored after being performed digital signal processing by the optical receiver 700, calculates a plurality of amplitude noise feature values to obtain statistics values of fiber nonlinear noises; the oscillator laser 710 is configured to provide a local light source; an optical signal is converted into a baseband signal in a polarization state after passing through the optical 90 deg hybrid 701, the opto-electronic (O/E) detectors 702 and 704 and the analog-to-digital converters (ADCs) 703 and 705; and the optical signal is converted into a baseband signal in another polarization state after passing through the optical 90 deg hybrid 701, the opto-electronic (O/E) 706 and 708 and the analog-to-digital converters (ADCs) 707 and 709, with a detailed process being similar to that in the related art, and being not going to be described herein any further.

Furthermore, if a frequency offset and a phase noise have an effect on estimation of fiber nonlinear noises, the optical receiver 700 may further include a frequency offset compensator and a phase noise compensator (not shown).

Figure 8:
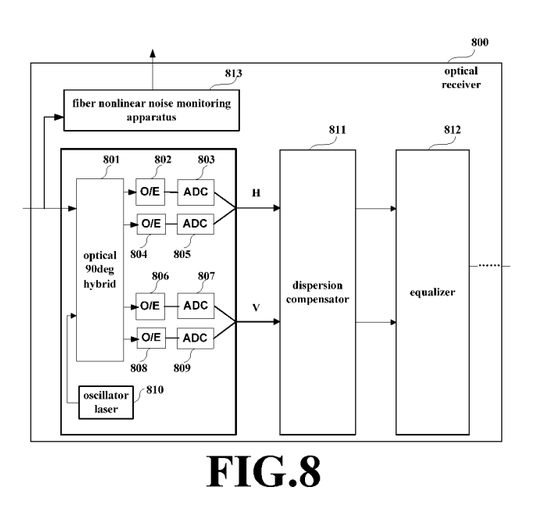
FIG. 8 is a schematic diagram of the optical receiver according to an embodiment of this disclosure.

FIG. 8 is a schematic diagram of a systematic structure of the optical receiver of Embodiment 3 of this disclosure. As shown in FIG. 8, an optical receiver 800 includes:

a front end configured to convert an input optical signal into baseband signals in two polarization states.

As shown in FIG. 8, the front end includes: an oscillator laser 810, an optical 90 deg hybrid 801, opto-electronic (O/E) detectors 802, 804, 806 and 808, analog-to-digital converters (ADCs) 803, 805, 807 and 809, a dispersion compensator 811, an equalizer 812 and a fiber nonlinear noise monitoring apparatus 813; wherein, a structure and functions of the fiber nonlinear noise monitoring apparatus 813 is identical to those of the apparatus 400 described in Embodiment 2, and the apparatus 813 acquires received signals to be monitored being performed without digital signal processing by the optical receiver 800, and a processing unit of the apparatus 813 performs digital signal processing on the acquired received signals to be monitored, and calculates a plurality of amplitude noise feature values to obtain statistics values of fiber nonlinear noises; the oscillator laser 810 is configured to provide a local light source; an optical signal is converted into a baseband signal in a polarization state after passing through the optical 90 deg hybrid 801, the opto-electronic (O/E) detectors 802 and 804 and the analog-to-digital converters (ADCs) 803 and 805; and the optical signal is converted into a baseband signal in another polarization state after passing through the optical 90 deg hybrid 801, the opto-electronic (O/E) 806 and 808 and the analog-to-digital converters (ADCs) 808 and 809, with a detailed process being similar to that in the related art, and being not going to be described herein any further.

Furthermore, if a frequency offset and a phase noise have an effect on estimation of fiber nonlinear noises, the optical receiver 800 may further include a frequency offset compensator and a phase noise compensator (not shown).

With the embodiment described above, by taking the received signals pre-obtained at different simulation scenarios as samples and taking a plurality of amplitude noise feature values extracted from the received signal samples as input features of the noise monitoring model, the noise monitoring model is trained by using a machine learning method, and the fiber nonlinear noises are monitored by using the model. Hence, no link parameter is needed to be taken as an input feature, and implementation is simple. And furthermore, no summation of a plurality of amplitude noise feature values is performed, which may improve precision of a result of monitoring fiber nonlinear noises.

Embodiment 4

Figure 9:
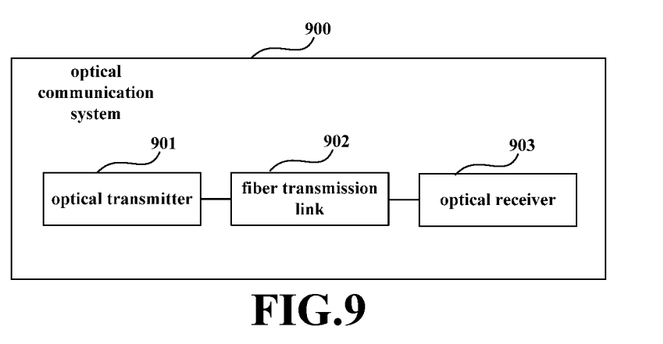
FIG. 9 is a schematic diagram of the optical communication system according to an embodiment of this disclosure.

This embodiment provides an optical communication system. FIG. 9 is a schematic diagram of the optical communication system of Embodiment 4 of this disclosure. As shown in FIG. 9, an optical communication system 900 includes an optical transmitter 901, a fiber transmission link 902 and an optical receiver 903; wherein, a structure and functions of the optical receiver 903 are identical to those in Embodiment 3, which shall not be described herein any further. And existing structures may be adopted for the optical transmitter 901 and the fiber transmission link 902.

Figure 10:
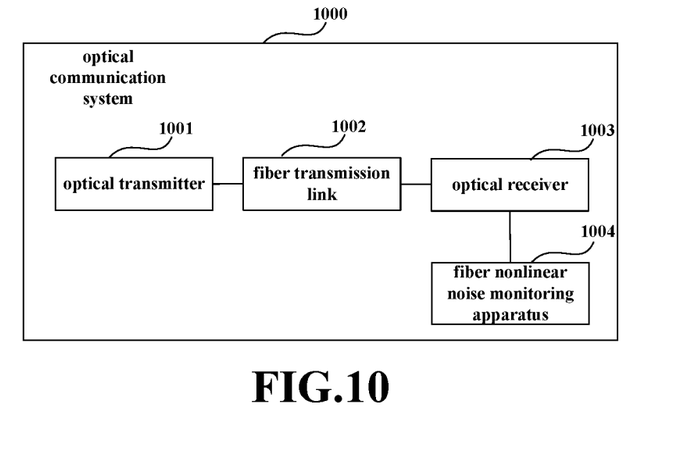
FIG. 10 is a schematic diagram of the optical communication system according to an embodiment of this disclosure.

This embodiment further provides an optical communication system. FIG. 10 is a schematic diagram of the optical communication system of Embodiment 4 of this disclosure. As shown in FIG. 10, an optical communication system 1000 includes an optical transmitter 1001, a fiber transmission link 1002, an optical receiver 1003 and a fiber nonlinear noise monitoring apparatus 1004; wherein, a structure and functions of the fiber nonlinear noise monitoring apparatus 1004 are identical to those in Embodiment 2, and the fiber nonlinear noise monitoring apparatus 1004 acquires received signals to be monitored passing through the fiber transmission link 1002 from the optical receiver 1003, or received signals to be monitored after being performed digital signal processing by the optical receiver 1003, which shall not be described herein any further. And existing structures may be adopted for the optical transmitter 1001, the fiber transmission link 1002 and the optical receiver 1003.

An embodiment of the present disclosure provides a computer readable program code, which, when executed in a fiber nonlinear noise monitoring apparatus or an optical receiver, may cause the fiber nonlinear noise monitoring apparatus or the optical receiver to carry out the fiber nonlinear noise monitoring method as described in Embodiment 1.

An embodiment of the present disclosure provides a computer storage medium, including a computer readable program code, which may cause a fiber nonlinear noise monitoring apparatus or an optical receiver to carry out the fiber nonlinear noise monitoring method as described in Embodiment 1.

The fiber nonlinear noise monitoring method carried out in the fiber nonlinear noise monitoring apparatus or the optical receiver described with reference to the embodiments of this disclosure may be directly embodied as hardware, software modules executed by a processor, or a combination thereof. For example, one or more functional block diagrams and/or one or more combinations of the functional block diagrams shown in FIGS. 4-9 may either correspond to software modules of procedures of a computer program, or correspond to hardware modules. Such software modules may respectively correspond to the operations shown in FIG. 1. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIGS. 4-9 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIGS. 4-9 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

For implementations of this disclosure containing the above embodiments, following supplements are further disclosed.

Supplement 1. A fiber nonlinear noise monitoring apparatus, including: an acquiring unit configured to acquire a training set, the training set including at least two received signal samples; wherein different received signal samples are obtained after a transmitting signal passes different simulation transmission scenarios;

a feature extracting unit configured to calculate a plurality of amplitude noise feature values of the received signal samples after being performed digital signal processing;

a calculating unit configured to calculate statistics values of fiber nonlinear noises to which the received signal samples correspond;

a marking unit configured to mark the plurality of amplitude noise feature values of the received signal samples according to the statistics values of the fiber nonlinear noises;

a training unit configured to take the plurality of amplitude noise feature values of the received signal samples as input of a noise monitoring model, take marks to which they correspond as target output of the noise monitoring model, and train the noise monitoring model by using a predetermined algorithm according to samples in the training set, so as to obtain a trained noise monitoring model; and a monitoring unit configured to input a plurality of amplitude noise feature values of received signals to be monitored into the trained noise monitoring model, so as to obtain statistics values of fiber nonlinear noises to which the received signals to be monitored correspond.

Supplement 2. The apparatus according to supplement 1, wherein parameters of the simulation transmission scenarios include: the number of channels, transmission power, a transmission distance, a fiber type, a fiber span combination, a modulation format and a baud rate of a channel signal, whether a link contains a reconfigurable optical add-drop multiplexer (ROADM), and a link dispersion compensation proportion.

Supplement 3. The apparatus according to supplement 1, wherein the transmitting signal is subjected to interference of transceiver noises and fiber nonlinear noises after passing the simulation transmission scenarios;

and the transmitting signal is not subjected to interference of ASE noises, or is subjected to interference of amplifier spontaneous emission (ASE) noises, after passing the simulation transmission scenarios.

Supplement 4. The apparatus according to supplement 1, wherein the amplitude noise feature values include amplitude noise covariance, the number of pieces of the amplitude noise covariance being determined according to an intra-symbol amplitude autocorrelation length resulted from the fiber nonlinear noises.

Supplement 5. The apparatus according to supplement 4, wherein the feature extracting unit calculates the amplitude noise covariance according to the received signal samples, or according to the received signal samples and the transmitting signal.

Supplement 6. The apparatus according to supplement 5, wherein the feature extracting unit inserts a periodic training sequence into a frame structure of the transmitting signal, synchronizes the received signals according to the periodicity, calculates amplitude noises according to the periodic training sequence and the received signals, and calculates the amplitude noise covariance according to the amplitude noises.

Supplement 7. The apparatus according to supplement 1, wherein the statistics values of fiber nonlinear noises include: normalized fiber nonlinear noise power, and a fiber nonlinear noise to signal ratio or a fiber nonlinear signal to noise ratio.

Supplement 8. The apparatus according to supplement 5, wherein the amplitude noise covariance is denoted by using a logarithmic value and/or by using a linear value.

Supplement 9. The apparatus according to supplement 1, wherein the calculating unit calculates first variance of an error between the received signal samples and a complex signal of a corresponding transmitting signal and second variance of an error between a received signal and a complex signal of a corresponding transmitting signal in a back-to-back scenario, and calculates the statistics values of the fiber nonlinear noises according to a difference between the first variance and the second variance.

Supplement 10. An optical receiver, including the apparatus as described in supplement 1.

Supplement 11. A fiber nonlinear noise monitoring method, including: acquiring a training set, the training set including at least two received signal samples; wherein different received signal samples are obtained after a transmitting signal passes different simulation transmission scenarios;

calculating a plurality of amplitude noise feature values of the received signal samples after being performed digital signal processing;

calculating statistics values of fiber nonlinear noises to which the received signal samples correspond;

marking the plurality of amplitude noise feature values of the received signal samples according to the statistics values of the fiber nonlinear noises;

taking the plurality of amplitude noise feature values of the received signal samples as input of a noise monitoring model, taking marks to which they correspond as target output of the noise monitoring model, and training the noise monitoring model by using a predetermined algorithm according to samples in the training set, so as to obtain a trained noise monitoring model; and inputting a plurality of amplitude noise feature values of received signals to be monitored into the trained noise monitoring model, so as to obtain statistics values of fiber nonlinear noises to which the received signals to be monitored correspond.

Supplement 12. The method according to supplement 11, wherein parameters of the simulation transmission scenarios include: the number of channels, transmission power, a transmission distance, a fiber type, a fiber span combination, a modulation format and a baud rate of a channel signal, whether a link contains a reconfigurable optical add-drop multiplexer (ROADM), and a link dispersion compensation proportion.

Supplement 13. The method according to supplement 11, wherein the transmitting signal is subjected to interference of transceiver noises and fiber nonlinear noises after passing the simulation transmission scenarios;

and the transmitting signal is not subjected to interference of ASE noises, or is subjected to interference of amplifier spontaneous emission (ASE) noises, after passing the simulation transmission scenarios.

Supplement 14. The method according to supplement 11, wherein the amplitude noise feature values include amplitude noise covariance, the number of pieces of the amplitude noise covariance being determined according to an intra-symbol amplitude autocorrelation length resulted from the fiber nonlinear noises.

Supplement 15. The method according to supplement 14, wherein the f calculating a plurality of amplitude noise feature values of the received signal samples after being performed digital signal processing includes: calculating the amplitude noise covariance according to the received signal samples, or according to the received signal samples and the transmitting signal.

Supplement 16. The method according to supplement 15, wherein the calculating the amplitude noise covariance according to the received signal samples and the transmitting signal includes: inserting a periodic training sequence into a frame structure of the transmitting signal, synchronizing the received signals according to the periodicity, calculating amplitude noises according to the periodic training sequence and the received signals, and calculating the amplitude noise covariance according to the amplitude noises.

Supplement 17. The method according to supplement 11, wherein the statistics values of fiber nonlinear noises include: normalized fiber nonlinear noise power, and a fiber nonlinear noise to signal ratio or a fiber nonlinear signal to noise ratio.

Supplement 18. The method according to supplement 15, wherein the amplitude noise covariance is denoted by using a logarithmic value and/or by using a linear value.

Supplement 19. The method according to supplement 11, wherein the calculating statistics values of fiber nonlinear noises to which the received signal samples correspond includes: calculating first variance of an error between the received signal samples and a complex signal of a corresponding transmitting signal and second variance of an error between a received signal and a complex signal of a corresponding transmitting signal in a back-to-back scenario, and calculating the statistics values of the fiber nonlinear noises according to a difference between the first variance and the second variance.

What is claimed is:

1. An apparatus for fiber nonlinear noise monitoring, the apparatus comprising:
   a memory;
   a processor coupled to the memory and the processor configured to:
      acquire a training set including at least two received signal samples obtained after a transmitting signal passes a simulation transmission scenario with different configurations,
      calculate a plurality of amplitude noise feature values of the at least two received signal samples after a digital signal processing is performed,
      calculate statistics values of fiber nonlinear noises to which the at least two received signal samples correspond,
      mark the plurality of amplitude noise feature values of the at least two received signal samples according to the statistics values of the fiber nonlinear noises,
      take the plurality of amplitude noise feature values of the at least two received signal samples as input of a noise monitoring model, take marks to which the plurality of amplitude noise feature values correspond as target output of the noise monitoring model, and train the noise monitoring model by using a machine learning algorithm according to samples in the training set, so as to obtain a trained noise monitoring model, the noise monitoring model being a machine learning model which maps a correspondence between the plurality of amplitude noise feature values and the statistics values of the fiber nonlinear noises, and
      input a plurality of amplitude noise feature values of received signals to be monitored after digital processing, obtained from an optical receiver into the trained noise monitoring model, so as to obtain respective statistics values of fiber nonlinear noises to which the received signals to be monitored correspond.

2. The apparatus according to claim 1, wherein parameters of the different configurations include:
   a number of channels, transmission power, a transmission distance, a fiber type, a fiber span combination, a modulation format and a baud rate of a channel signal, whether a link contains a reconfigurable optical add-drop multiplexer (ROADM), and a link dispersion compensation proportion.

3. The apparatus according to claim 1, wherein the transmitting signal is subjected to interference of transceiver noises and fiber nonlinear noises after passing the simulation transmission scenario, and
   the transmitting signal is not subjected to interference of ASE noises, or is subjected to interference of amplifier spontaneous emission (ASE) noises, after passing the simulation transmission scenario.

4. The apparatus according to claim 1, wherein the plurality of amplitude noise feature values include:
   amplitude noise covariance, a number of pieces of the amplitude noise covariance being determined according to an intra-symbol amplitude autocorrelation length resulted from the fiber nonlinear noises.

5. The apparatus according to claim 4, wherein the amplitude noise covariance is calculated according to the at least two received signal samples, or according to the at least two received signal samples and the transmitting signal.

6. The apparatus according to claim 5, wherein the processor inserts a periodic training sequence into a frame structure of the transmitting signal, synchronizes the received signals according to periodicity, calculates amplitude noises according to the periodic training sequence and the received signals, and calculates the amplitude noise covariance according to the amplitude noises.

7. The apparatus according to claim 1, wherein the statistics values of fiber nonlinear noises obtained include: normalized fiber nonlinear noise power, and a fiber nonlinear noise to signal ratio or a fiber nonlinear signal to noise ratio.

8. The apparatus according to claim 5, wherein the amplitude noise covariance is denoted by using a logarithmic value and/or by using a linear value.

9. The apparatus according to claim 1, wherein the processor calculates first variance of an error between the at least two received signal samples and a complex signal of a corresponding transmitting signal, and
   calculates second variance of an error between a received signal and a complex signal of a corresponding transmitting signal in a back-to-back scenario, and calculates the statistics values of the fiber nonlinear noises according to a difference between the first variance and the second variance.

10. An optical receiver, which is configured to provide received signals to be monitored after digital signal processing, and including the apparatus as described in claim 1.

11. A method of fiber nonlinear noise monitoring, comprising:
   acquiring a training set including at least two received signal samples obtained after a transmitting signal passes a simulation transmission scenario with different configurations;
   calculating a plurality of amplitude noise feature values of the at least two received signal samples after a digital signal processing is performed;
   calculating statistics values of fiber nonlinear noises to which the at least two received signal samples correspond;
   marking the plurality of amplitude noise feature values of the at least two received signal samples according to the statistics values of the fiber nonlinear noises;
   taking the plurality of amplitude noise feature values of the at least two received signal samples as input of a noise monitoring model, taking marks to which the plurality of amplitude noise feature values correspond as target output of the noise monitoring model, and training the noise monitoring model by using a machine learning algorithm according to samples in the training set, so as to obtain a trained noise monitoring model, the noise monitoring model being a machine learning model which maps a correspondence between the plurality of amplitude noise feature values and the statistics values of fiber nonlinear noises; and inputting a plurality of amplitude noise feature values of received signals to be monitored after digital signal processing, obtained from an optical receiver into the trained noise monitoring model, so as to obtain respective statistics values of fiber nonlinear noises to which the received signals to be monitored correspond.

12. The method according to claim 11, wherein parameters of the different configurations include:
a number of channels, transmission power, a transmission distance, a fiber type, a fiber span combination, a modulation format and a baud rate of a channel signal, whether a link contains a reconfigurable optical add-drop multiplexer (ROADM), and a link dispersion compensation proportion.

13. The method according to claim 11, wherein the transmitting signal is subjected to interference of transceiver noises and fiber nonlinear noises after passing the simulation transmission scenario, and
the transmitting signal is not subjected to interference of ASE noises, or is subjected to interference of amplifier spontaneous emission (ASE) noises, after passing the simulation transmission scenario.

14. The method according to claim 11, wherein the plurality of amplitude noise feature values include:
amplitude noise covariance, a number of pieces of the amplitude noise covariance being determined according to an intra-symbol amplitude autocorrelation length resulted from the fiber nonlinear noises.

15. The method according to claim 14, wherein the calculating of the plurality of amplitude noise feature values of the at least two received signal samples after the digital signal processing is performed includes:
calculating the amplitude noise covariance according to the at least two received signal samples, or according to the at least two received signal samples and the transmitting signal.

16. The method according to claim 15, wherein the calculating of the amplitude noise covariance according to the at least two received signal samples and the transmitting signal includes:
inserting a periodic training sequence into a frame structure of the transmitting signal, synchronizing the received signals according to periodicity, calculating amplitude noises according to the periodic training sequence and the received signals, and calculating the amplitude noise covariance according to the amplitude noises.

17. The method according to claim 11, wherein the statistics values of fiber nonlinear noises include: normalized fiber nonlinear noise power, and a fiber nonlinear noise to signal ratio or a fiber nonlinear signal to noise ratio.

18. The method according to claim 15, wherein the amplitude noise covariance is denoted by using a logarithmic value and/or by using a linear value.

19. The method according to claim 11, wherein the calculating statistics values of fiber nonlinear noises to which the at least two received signal samples correspond includes:
calculating first variance of an error between the at least two received signal samples and a complex signal of a corresponding transmitting signal, and second variance of an error between a received signal and a complex signal of a corresponding transmitting signal in a back-to-back scenario, and
calculating the statistics values of the fiber nonlinear noises according to a difference between the first variance and the second variance.

* * * * *